Figure 1:
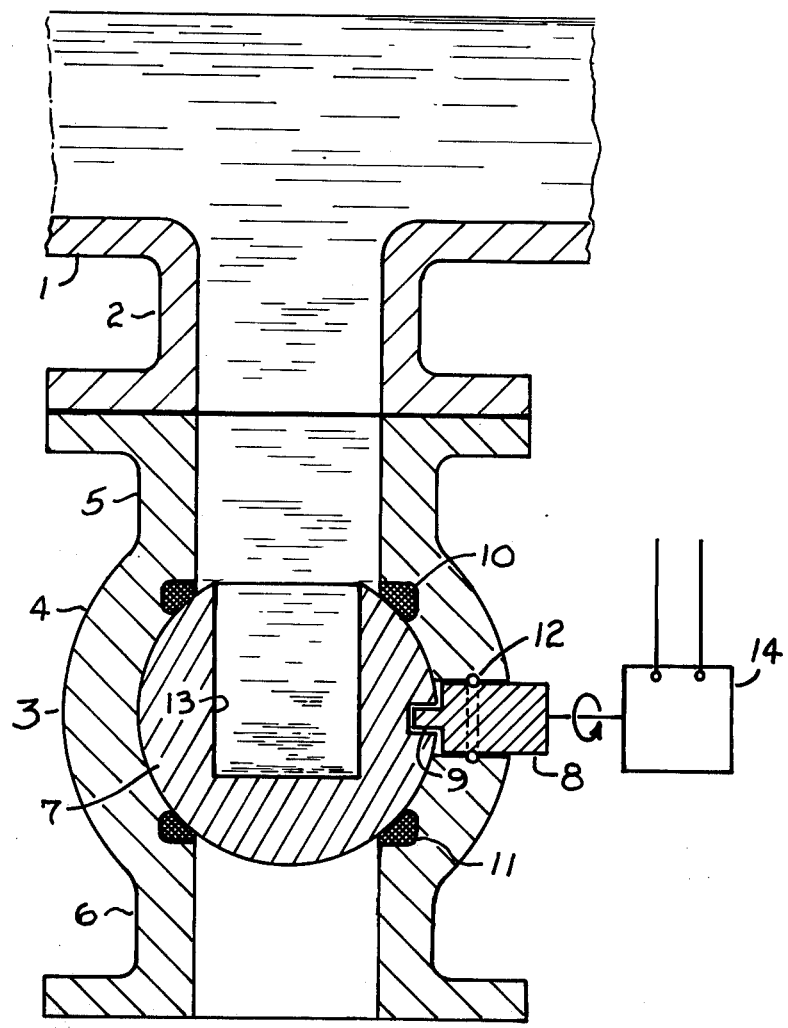

United States Patent [19]

Becker

[11] 4,058,240

[45] Nov. 15, 1977

[54] AUTOMATIC DRAIN FOR COMPRESSED AIR SYSTEMS

[75] Inventor: Philip S. Becker, Erie, Pa.

[73] Assignee: Valex Inc., Erie, Pa.

[21] Appl. No.: 677,007

[22] Filed: Apr. 14, 1976

[51] Int. Cl.² ............................................. G01F 11/22
[52] U.S. Cl. .................................... 222/368; 417/518
[58] Field of Search ..................... 415/6, 202; 417/518, 417/519; 222/410, 404, 256, 264, 368, 370

[56] References Cited

U.S. PATENT DOCUMENTS 2,424,675  7/1947  Wood ................................... 222/368
3,139,996  7/1964  Welty ................................. 222/368 X
3,446,404  5/1969  Mehta ............................... 222/368 X

FOREIGN PATENT DOCUMENTS 168,688    12/1950  Austria ................................ 222/368
1,091,215  11/1967  United Kingdom ................ 222/368

Primary Examiner—Stanley H. Tollberg
Attorney, Agent, or Firm—Ralph Hammar

[57] ABSTRACT

An automatic drain system for compressed air systems, air dryers, aftercoolers, separators and the like, which eliminates the loss of compressed air and is not clogged by sediment in the accumulated liquid or slurry.

6 Claims, 2 Drawing Figures

U.S. Patent  Nov. 15, 1977  4,058,240

AUTOMATIC DRAIN FOR COMPRESSED AIR SYSTEMS

In compressed air dryers, aftercoolers and separators, moisture is condensed and collects in a sump which must be periodically drained. Dirt, scale, oil, carbon, etc., are carried into the sump as the moisture condenses. Heretofore the drainage has been effected by opening a valve in the sump and allowing the compressed air to blow the condensate out, a procedure which causes loss of compressed air and violent scattering of the contaminated liquid or slurry.

This invention is intended to drain the condensate continuously without loss of compressed air. This is accomplished by a rotating valve having a cup which receives the condensate when the cup is upright and empties the condensate when the cup is inverted. In all positions, the valve is sealed against the loss of compressed air.

In the drawing

Figure 2:
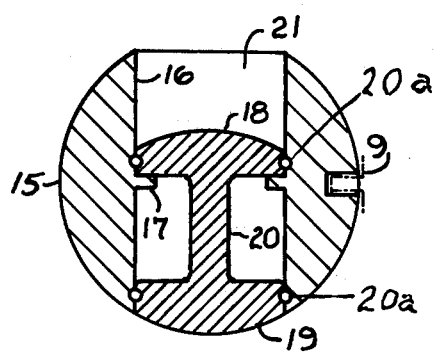

FIG. 1 shows a drainage system for compressed air dryers, aftercoolers and the like and FIG. 2 is a section through a modification of the valve.

In the drawing the numeral 1 indicates the sump of a compressed air dryer, aftercooler, separator or the like having a drain 2 in its lowermost part. During operation of the compressed air system, moisture is removed from the compressed air and settles into the sump. Heretofore excess accumulation of liquid in the sump has been prevented by periodically opening a drain valve and allowing the compressed air to force the liquid out through the drain 2. This has caused a substantial loss of compressed air, plus violent broadcast of accumulated liquids, solids, etc. The loss of compressed air is prevented by draining the sump through a rotary valve 3, such as a ball valve, which is specially designed to block the flow of compressed air in all positions of the valve. The valve has a body 4 with an inlet 5 connected to the drain and an outlet 6 for connection to a suitable drain line or open bucket. The need for a drain line is eliminated as there is never any massive discharge of the combined compressed gas and accumulated liquid or slurry. In the body of the valve is a ball 7 rotatable by a spindle 8 having a tongue and slot driving connection 9 to the ball. The seals 10 and 11 prevent leakage between the ball and the body and a seal 12 prevents leakage around the stem. The ball has a bore 13 through the center of the ball and normal to the axis of the spindle 8. The bore only extends part way through the ball so as to form a cup which in the upright position has its open end presented to the liquid in the sump. When the stem 8 is rotated 180° from the position shown, the cup will be inverted and the liquid contained in the cup emptied by gravity. In passing from the upright to the inverted positions, the bore 13 passes through an intermediate position in which the open end of the cup is between the seals 10 and 11 which prevent loss of compressed air and also hold all of the liquid within the bore. The seals 10 and 11 block the flow of compressed air in all positions of the ball. So long as any part of the open end of the bore is presented to the liquid in the sump, the full pressure of the compressed air acting on the liquid forces the liquid into the bore so the bore is completely filled with liquid. The stem 8 is driven by a geared electric motor 14 providing a very slow and continuous rotation approximately one to ten R.P.M. An in line pressure switch starts the motor when the system is pressurized and stops the motor only when the system is depressurized. A compressed gas operated motor may be substituted for the electric motor. Automatic drain valves now on the market using floats or other controls for the liquid level in the sump are not reliable under the conditions which exist in compressed air and gas systems.

In the construction showing FIG. 1, the drain from the cup 13 is by gravity. Because the sump may contain sediment of mudlike consistency, there is a possibility that the draining of the cup 13 may not be complete. This is overcome by substituting the ball 15 for the ball 7. The ball 15 has a bore 16 extending diametrically through the ball with a stop 17 midway between its ends. The stop cooperates with heads 18 and 19 of the piston 20. Seals 20a prevent any leakage into the space between the heads 18, 19 in all positions of the piston 20 in the bore 16. In the position shown in FIG. 2, the piston head 18 is forced against a stop 17 by the pressure of the compressed air providing a pocket for cup 21 with its open top presented to the liquid in the sump. When the ball 15 has rotated 90° from the position shown, both ends of the bore 16 are sealed from the compressed air by the seal 10 and from the drain 6 by the seal 11. When rotated 180° from the position shown the piston head 19 occupies the uppermost position and the piston head 18 is forced downward by the pressure of the compressed air acting on the piston head 19. This provides positive ejection of any liquid contained in the cup 21. In the process of ejecting liquid from the cup 21 the piston head 19 moves downward providing another cup similar to cup 21 for receiving liquid. Not only does the FIG. 2 construction provide positive emptying, but it also permits mounting the valve in any orientation since the action of the piston heads 18, 19 provides a positive pressure for expelling the liquid. From one aspect the piston 18, 19, 20 acts as a pump. Preferably the radius of the curvature of the outer ends of the piston heads 18, 19 is the same as the radius of the curvature of the ball 15.

The invention is not limited to ball valves. Any rotatable valve having the equivalent functions may be used.

I claim:

1. In combination with a compressed air system and the like having a liquid collecting sump under the elevated pressure of the air system, a valve for draining the sump without substantial loss of air comprising a valve body having an inlet connected to receive liquid from the sump under said elevated air pressure and an outlet for said liquid to a lower pressure, a valve member rotatable in the body for blocking flow through the body in all angular positions of the member, said body having cup means presented to the inlet in one angular position of the member to receive liquid from the inlet and presented to the outlet in another angular position of the member to empty the cup means, and means for continuously rotating the valve member.

2. The combination of claim 1 in which the valve member is a ball.

3. The combination of claim 2 in which the cup means comprises a bore extending inward from the outer surface part way through the ball.

4. The combination of claim 1 in which the cup means comprises a bore extending through the valve body open at both ends and a piston slidable in and of lesser length than the bore forms a cup at each end of the bore.

5. The combination of claim 4 in which stop means on the ball limits the inward movement of the piston relative to the ball so that the end of the piston subject to gas pressure moves inward to increase the depth of the cup at that end and decrease the depth of the cup at the other end and therefore expell liquid.

6. The combination of claim 1 in which the valve member is slowly and continuously rotated by a motor controlled by a pressure switch which starts the motor when the system is pressurized and stops the motor when the system is depressurized.

* * * * *